Dec. 13, 1949  P. G. KOONTZ  2,491,320
NEUTRON DETECTOR AND METHOD OF MAKING SAME
Filed July 27, 1944

WITNESSES.
Ralph Carlisle Smith
Louis F. Jacot

INVENTOR.
Philip G. Koontz
BY
Robert A. Lanouette

Patented Dec. 13, 1949

2,491,320

UNITED STATES PATENT OFFICE 2,491,320

NEUTRON DETECTOR AND METHOD OF MAKING SAME

Philip G. Koontz, Fort Collins, Colo., assignor to the United States of America as represented by the United States Atomic Energy Commission Application July 27, 1944, Serial No. 546,912

3 Claims. (Cl. 250—83.6)

This invention relates to methods and means for neutron detection, and more particularly to improved neutron-detecting materials.

Neutron detection and the measurement of the density of neutron background as well as the intensity of the energy of the neutrons has received considerable attention in recent years. The newer sources of large quantities of neutron energy such as the chain reaction fission of certain nuclei of the type of uranium and plutonium (element 94) has intensified this interest in such measurements. As is generally known, and implied by the name, neutrons lack an electrical charge and are thus difficult to observe and measure. Likewise, their small mass and penetrating character limit their observation. Consequently, in many cases, particularly with slow neutrons, they are detected or measured by inducing activity in a second substance, which induced activity can be measured, and being proportional to the neutron density at least for certain energies, is a secondary measure thereof.

A common procedure is to place a substance which undergoes reaction with, or fission under bombardment with, neutrons in an ionization chamber so that, although the neutron has no direct action on the chamber electrodes, it does cause some reaction with this added substance yielding highly ionizing particles. These particles cause an ionization current by ionization of the gas in the chamber which current is observed as a measure of the relative neutron density, at least for the neutrons having a velocity or energy which influences the added substance. By selecting a substance such as uranium 235 which has a wide range of sensitivity to neutrons, fair measure of the total neutron density can be obtained. Conversely, if the density of a particular energy range of neutrons is desired, it is possible to determine this by measuring neutron density both with and without the interposition of a filtering substance, such as cadmium, which has a resonance or maximum absorption of neutrons of a particular energy but little absorption of neutrons of other energies. The difference in the values obtained with and without the filter substances will give the intensity of those neutrons having energies corresponding to the resonance absorption of the filtering substance.

These methods have utility but are not wholly satisfactory for all purposes. The devices occupy a substantial volume and require electrical connection. It is not always convenient to have such a large piece of equipment in the place at which the neutron density or intensity is to be observed. Furthermore, if the neutron density at a number of points is desired, for example, in a chain reacting quantity of fissile (fissionable) material, it is not feasible to have this quantity of equipment within the reacting mass—not only from space consideration but because of its influence on the reaction.

It is an object of this invention to overcome these shortcomings of the prior art methods. It is a further object to provide an improved method and means for detecting neutrons, for measuring their density, and for measuring their energy.

This invention in general involves a method wherein a small quantity of material which is rendered artificially radioactive when subjected to neutrons is placed at the point at which neutron detection or measurement is desired. The material is then removed from the field in which the neutrons are likely to be present and placed in the vicinity of a Geiger-Müller counter or other such device which can measure radioactivity. If neutrons of the energy which would induce radioactivity in the material were present at the point of detection or measurement, then it is probable that the material would have been rendered artificially radioactive and it would activate the counter or other device. The degree of induced radioactivity, which in turn depends on the neutron density, the time of exposure thereto, the time between radioactivity induction and the measurement thereof, and the quantity, shape and condition (e. g., apparent density) of the material, is measurable by the radioactive-sensitive device.

By fixing the conditions of a particular observation so that the results may be compared with the effect of a standard neutron source for the same conditions, it is possible to obtain absolute values for neutron density of certain energy neutrons or for the whole range of neutron energies depending on the material, or mixture of materials employed or the presence of other agents.

The procedure may be modified by surrounding a material that is rendered radioactive by slow neutrons with a neutron slowing substance so that substantially all the neutrons that reach the material will be slowed to velocities or energies which effect the radioactivity induction.

The standardization of conditions for observations for comparison with known neutron densities can be readily made as to the time of exposure, and time elapse between induction and observation, but the uniformity of shape and condition of the material has presented a great problem. Generally speaking it is desirable to have a large but measurable surface both for induction and for observation, hence it is preferred to operate with thin sheets of material. These sheets should have uniform dimensions which are relatively easily fixed in a lateral direction but are difficult to attain in thickness. Furthermore, the sheets should be relatively flexible and not brittle in order to enable them to be handled in the radioactivity induction step and particularly to permit them to be flexed around the cylindrical tube of a Geiger-Müller counter or other measuring device. Many of the desirable materials for this purpose are not malleable hence cannot be worked into sheets of uniform thickness. Furthermore, many suitable materials are brittle or are relatively infusible, hence usually are obtained in a subdivided state. Obviously such materials are difficult to prepare in the form of thin, flexible sheets of uniform thickness and density.

The present applicant has devised a novel method of preparing uniform flexible sheets of neutron sensitive material for this purpose. A quantity of finely divided powder of the selected material is uniformly spread in a matrix or die such as a plate with a depression therein or hole therethrough of uniform depth. The powder is then pressed to a dry, thin, hard, uniform layer whereby the apparent density approaches the actual density of the material by means of a punch adapted to fit the matrix or hole in the plate. By using a finely divided powder of substantially the same composition, grain size and grain shape, in substantially the same proportion in the same type mold with substantially the same pressure, it is possible to prepare and duplicate thin layers of the neutron detecting materials.

The layers are made very thin, preferably less than a millimeter, so they are quite flexible and able to withstand considerable bending. Furthermore, they possess great surface per unit weight and consequently are in an optimum shape for radio-activity induction and measurement, and for prevention of self-absorption.

An apparatus for performing this novel method is illustrated in the accompanying drawing forming a part of this specification, in which.

Figure 1:
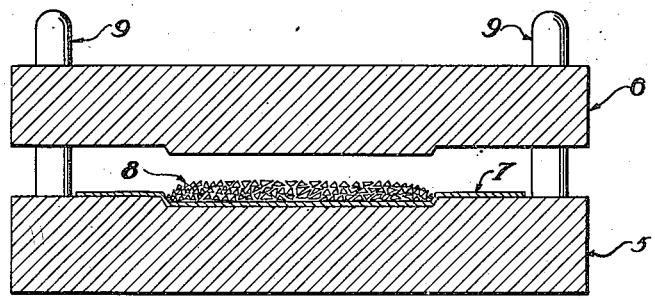
Figure 1 is a vertical sectional view of the device for forming the sheets.
Figure 2:
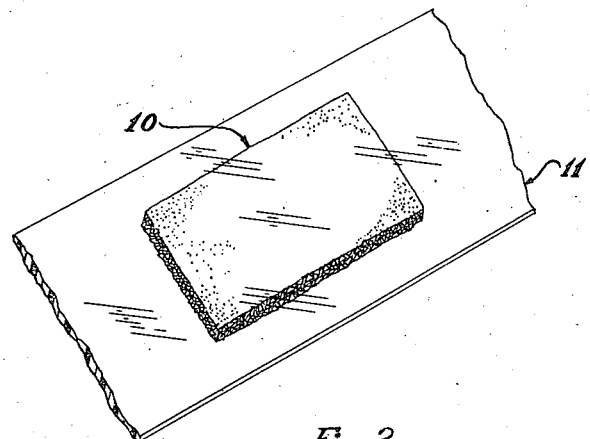
Figure 2 is a perspective showing one such sheet attached to a length of transparent cellophane tape.

Referring now to Figure 1 the device consists of a plate matrix or die 5 with a rectangular shaped, bevelled sided depression or hole of uniform depth therein. An aligned and cooperating punch 6 is positioned above the die 5. A metal foil 7 may be used to line the die depression. A quantity of finely divided powder 8 of the selected material is uniformly spread on the foil layer of the die. The powder is then pressed to a dry, thin, hard uniform layer by the action of the punch 6 which is slidably mounted on the punch guide 9. If foil 7 is used, it may be employed to lift the resulting pressed sheet or film 10 from the die. It is advantageous as shown in Figure 2 to attach a flexible backing medium 11, e. g. cellophane scotch tape to the film or sheet 10.

The fine particle size permits good packing of the particles. In making the particles it is preferred to employ the same method when duplicating results or matching standards, because with different particle shapes different apparent densities sometimes result. For example, a hammer mill will produce a flattened particle whereas a ball mill will tend to produce rounded particles. Furthermore, it is sometimes advantageous to blend particles of different sizes in order to get maximum packing before pressing.

The pressure applied may be varied over a broad range but it is advantageous to use between about one and ten tons per square inch.

The sheet when prepared can be checked for uniformity by weighing and calculating the volume from observed dimensions, then determining the apparent density of the sheet. It will generally be at least seventy-five to eighty percent of the actual density of the powdered material from which it is made.

By suitable selection of the punch and die, sheets or layers may be made in any desired shape such as squares, circles, ovals or the like. Likewise, sheets may be prepared curved in order to conform with the curved surface of a neutron source or the curved surface of a radioactivity measuring device.

To facilitate the removal of the pressed sheets from the matrix, it is sometimes advantageous to line the die with a metal foil before adding the powder, for example, by spreading a sheet of aluminum foil over the hole in the matrix or die and pressing it into the depression or hole with the punch. Where the powder is sprinkled in the cup of metal foil and pressed into a thin flexible sheet it can be removed from the die after removal of the punch by lifting out the metal foil which can be easily separated from the pressed powder sheet.

The plate or sheet can be reinforced, waterproofed and/or protected generally, if desired, by means of a flexible backing such as pressure plastic tape (cellophane Scotch tape), thermoplastic tape or moisture plastic tape. Likewise, a thin coating of lacquer, paint, wax, glue, size, varnish and/or enamel can be applied. In general it is preferred to omit these reinforcements but if any are used, it is preferred that they be applied only to one side of the sheet. The covering might, in addition, be a neutron slowing agent which brings the fast neutrons to an observable energy.

It is also possible to impregnate the sheet with an addition agent, e. g., an aqueous solution of a material which can be converted to substantially the same material as the pressed plate or at least have the same active nuclei. This impregnation can be done before pressing of the material, e. g., by addition of a plastic material or other chemical agent, or solution thereof, to the powder, or it can be added by impregnation of the finished sheet.

The neutron detecting materials which may be used in the preparation of the layer include any non-radioactive substance having a nucleus which will by the action of neutrons thereon be rendered radioactive with a substantial half life of at least a few minutes but not greater than a few days, which will be solid under the conditions of operation, and which is substantially free of nuclei which capture neutrons without inducing radioactivity or of nuclei which fission with neutrons to produce two nuclei of about half the molecular weight. Mixtures of nuclei may be used either as chemical compounds or physical mixtures of elements and/or compounds. In some cases, although several kinds of neutron sensitive nuclei are present in a compound or mixture, only one kind of nucleus is substantially effective because of great differences in capture cross sections for the energy of the neutrons involved. In other cases, the different nuclei will capture neutrons of different energies so as to cover the range of neutron energies. The relative proportion of each type of activity can be determined from observation of a total rate of decay of induced radioactivity, and from previous knowledge of rate of decay of radioactivity of each type nucleus separately. This discussion of nuclei not only applies to nuclei differing in atomic number but also to different isotopes of the same atomic number. In other words, normal isotope mixtures, enriched mixtures, or single isotopes can be employed.

Among the particularly suitable materials for use in the present process are manganese dioxide, indium oxide, lead iodide, dysprosium oxide, and the like.

These materials per se are quite satisfactory but it is sometimes desired to increase the physical strength of the layer or sheet. This may be accomplished by several methods. It is advantageous to use a binder which will have the same constitution as the neutron detecting sheet when the foil is finished or at least will have the same active nuclei. For example, it is feasible to incorporate a solution or a suspension of a compound of the active nuclei with the powdered material prior to the pressing or thereafter, and after the pressing, or simultaneously therewith, to heat the material to a temperature at which the material is dried and preferably converted to the same constitution as the powder. For example, it is possible to take the pressed plate of insoluble pressed powder and impregnate it with an aqueous solution of a soluble compound of the active nuclei, e. g., the nitrates which will decompose to oxide on heating, and the complex ammine or ammonium salts which can be selected to form a variety of compounds of metallic nuclei upon heating, such as the halides, hydroxides, sulphates or the like. The impregnation of the sheet may be done in one or more steps.

It is also possible to incorporate a measured proportion of pressure plastic material and/or thermoplastic material with the powdered material, preferably before the powder is pressed. This will help to form a firm flexible sheet. With this type addition agent, which is usually organic, hence high in carbon, hydrogen and sometimes oxygen content, there is a fair amount of slowing of the neutrons. This will interfere with the indications of the energy of the neutrons by resonance capture but on the other hand it will help to increase the capture cross section of most material so that higher efficiency of total detection will be attained.

Resins, gums, waxes or synthetic resin, gums, and waxes and the like may be used for this purpose. For example, paraffin wax, beeswax, stearic acid, gum tragacanth, polyacrylates or polymerized olefines may be used with the powder, and may be incorporated directly or by solution in a volatile solvent and removal of the solvent. The pressure with or without heating will cause the plastic material to flow sufficiently to bond the particles.

The sheet with or without binder may be covered on one or both faces with one or more of various type materials. If there is no binder, it is often advantageous to cover one face with a flexible tape, such as pressure plastic (cellophane Scotch) tape. This increases the strength yet assures flexibility of the sheet. It also improves moisture resistance and provides a handling surface. It is also desirable at times to cover the sheet with a neutron-slowing substance such as paraffin wax, polyethylene or the like. This material is advantageously removed from the radioactive sheets before measuring the activity with an ionization chamber or the like, consequently it is desirable to have the film removably attached or to have a thin layer of paper or the like interposed. These will not stop the neutrons from activating the neutron-detecting material but they might interfere with observation of the radioactivity if the resulting activity is evidenced by alpha particles.

The density of neutrons at a particular area can be ascertained in still another way. It is possible to place together several layers of the same or different neutron-detecting material with or without interlayers of neutron-slowing material, and then place the combined sheets at the area to be observed. The sheets may be arranged with the fastest neutron detector at the center and the slower on the outside. The slow neutrons will largely be removed but the faster ones will reach the center. Of course, there is some neutron slowing as the neutrons pass through the combined sheets but by standardizing with known sources, the spectra of neutron energies may be identified accurately. The individual sheets may be checked for induced radioactivity jointly but it is preferred to separate them and test each one separately.

Of course, if equilibrium conditions obtain it is possible to put the different type sheets in separately and consecutively. In addition the same or different type sheets may be simultaneously placed at several points in the neutron zone. However, if too many are used at once with neutron sources which operate by reason of chain reaction fission, it is possible that the neutron detectors will absorb sufficient neutrons to stop the chain.

Although a Geiger-Müller counter is preferred, any standard means for detecting and measuring radioactivity may be used in the second step, including, for example, ionization chamber, electroscope, electrometer and proportional counter. Coincidence counting may be applied to the counting circuits.

The following example is given for the purpose of illustrating the present invention but is not intended to be limiting on the scope thereof:

*Example*

About one gram of finely divided precipitated manganese dioxide is uniformly spread in an aluminum foil-lined rectangular depression in a steel plate, said depression or matrix being about five by seven centimeters. A corresponding punch is fitted in the matrix on top of the uniformly spread manganese dioxide powder. The assembled die and punch are then placed in an unheated hydraulic press, and a load of about ten tons per square inch is applied and maintained for at least one minute. The pressure is released, the punch withdrawn, and the sheet of pressed manganese dioxide removed from the matrix by lifting the edges of aluminum foil. The foil is stripped off the sheet and a length of pressure plastic (cellophane Scotch) tape is pressed onto both of the flat surfaces, avoiding handling of the surfaces of the sheet. The sheet is then placed in a slow neutron atmosphere at a point at which knowledge of the neutron density is desired for a few minutes the number depending upon neutron intensity. The sheet is then removed from the zone and is curved around and in contact with the curved surface of a Geiger-Müller counter which is coupled with electronic detecting apparatus and a mechanical recorder. The induced radioactivity is measured for a period of about twenty minutes to an hour. A number of similar disks or sheets are prepared identically and standardized by an identical operation with known densities of neutrons which vary over a wide range of values. Also other neutron detectors can be compared for standardization. Neutron densities should also be standardized for various neutron energies of about the energy of the neutrons to be measured. By comparing the observed radioactive values with the standard values, the density of those neutrons capable of activating manganese is determined.

As many widely different embodiments of the present invention may be made without departing from the spirit or scope thereof, it is to be understood that it is not to be limited except as defined in the appended claims.

I claim:

1. The process of preparing neutron-detecting media, which comprises lining a matrix with a metal foil, uniformly spreading in said foil a powdered chemical compound material, containing nuclei which are rendered radioactive by neutrons, with a corresponding die pressing at high pressures the powdered material into a thin flexible strong sheet, and then removing the pressed sheet from the foil.

2. A flexible strong sheet of less than one millimeter thickness of compressed powdered manganese dioxide.

3. A thin flexible strong sheet of binder impregnated compressed powdered manganese dioxide.

PHILIP G. KOONTZ.

REFERENCES CITED

The following references are of record in the file of this patent:

UNITED STATES PATENTS

| Number | Name | Date |
|---|---|---|
| 1,480,896 | Davey | Jan. 15, 1924 |
| 1,517,861 | Rasher | Dec. 2, 1924 |
| 1,523,013 | Greenslade | Jan. 13, 1925 |
| 1,625,463 | Gauthier | Apr. 19, 1927 |
| 2,124,225 | Batchelor | July 19, 1938 |
| 2,127,994 | Davis et al. | Aug. 23, 1938 |
| 2,206,634 | Fermi | July 2, 1940 |
| 2,230,618 | Kallmann | Feb. 4, 1941 |
| 2,266,738 | Byler | Dec. 23, 1941 |
| 2,298,885 | Hull | Oct. 13, 1942 |
| 2,361,925 | Brassert | Nov. 7, 1944 |

FOREIGN PATENTS

| Number | Country | Date |
|---|---|---|
| 801,400 | France | May 16, 1936 |